United States Patent [19]
Fok et al.

[11] Patent Number: 5,933,259
[45] Date of Patent: Aug. 3, 1999

[54] REMOTELY DISPOSED HIGH SPEED SWITCHES FOR HIGH SPEED CONNECTION BETWEEN COMPUTERS AND PERIPHERAL DEVICES

[75] Inventors: Simon Fok, Militas; Chung Liang Yen, San Jose, both of Calif.

[73] Assignee: Gigalabs, Inc, Sunnyvale, Calif.

[21] Appl. No.: 08/884,367

[22] Filed: Jun. 27, 1997

[51] Int. Cl.$^6$ .................................................. H04J 14/00
[52] U.S. Cl. ........................ 359/115; 359/152; 359/113; 359/117
[58] Field of Search ................................. 359/113, 115, 359/118, 152, 173, 117, 128, 139; 385/16–17

[56] References Cited

U.S. PATENT DOCUMENTS 5,315,424  5/1994  Boden et al. ............................ 359/152
5,646,761  7/1997  Medved et al. ......................... 359/152

*Primary Examiner*—Kinfe-Michael Negash

[57] ABSTRACT

Apparatus adapted to interconnect first and second remotely disposed crosspoint switches utilizing first and second component assemblies, each first and second assembly being associated with a corresponding one of the first and second switches. Each assembly includes an internal system bus connected in bi-directional manner to switch control sections, a data multiplexer and de-multiplexer, and a CPU with watch dog timer, and further includes a routing table connected to said CPU and an optical transceiver connected to the multiplexer and de-multiplexer. An optical fiber transmission cable interconnects both optical transceivers.

4 Claims, 1 Drawing Sheet

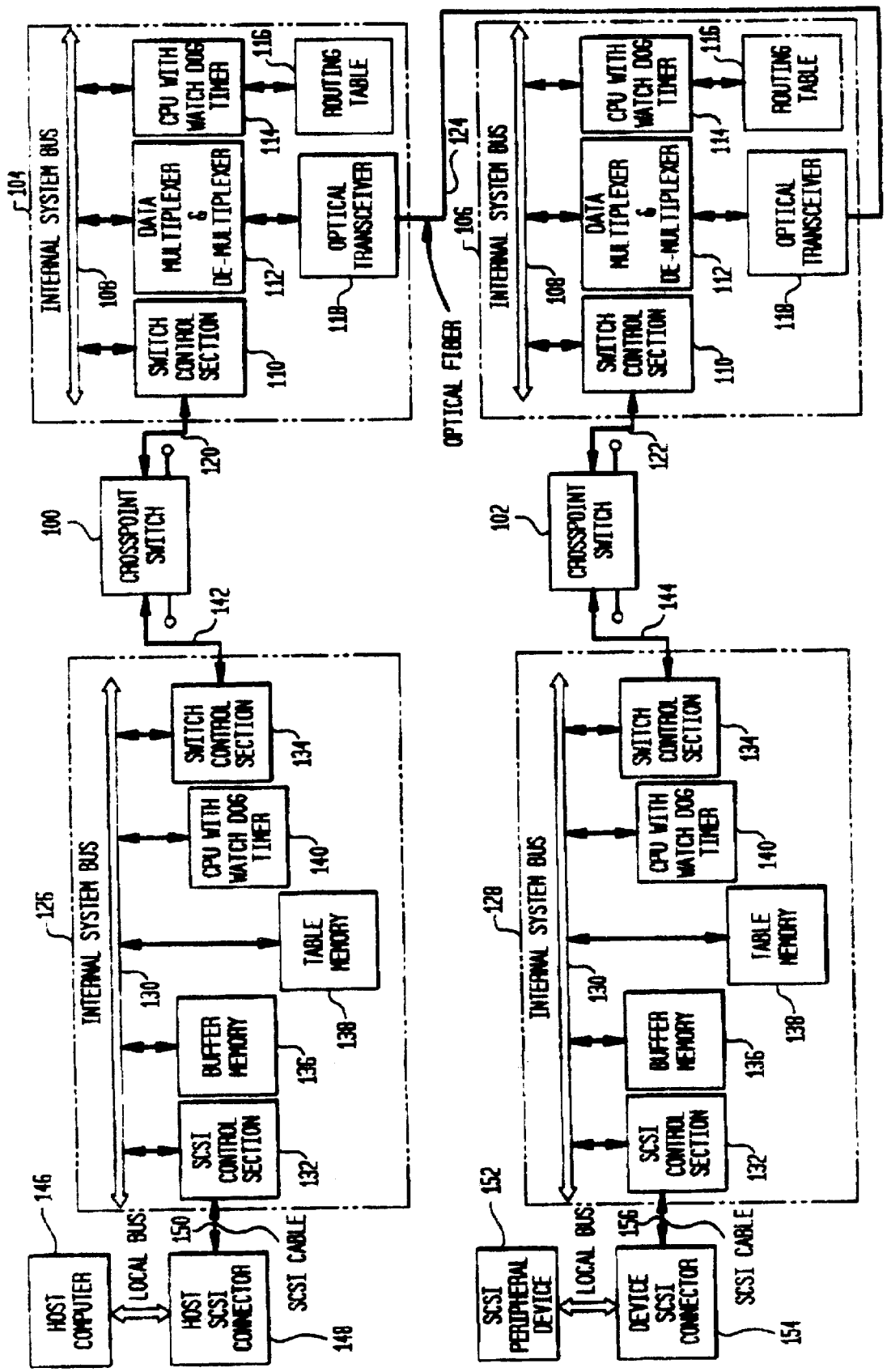

REMOTELY DISPOSED HIGH SPEED SWITCHES FOR HIGH SPEED CONNECTION BETWEEN COMPUTERS AND PERIPHERAL DEVICES

CROSS REFERENCE TO CO-PENDING APPLICATION

This application is related to copending application entitled HIGH SPEED SWITCH FOR HIGH SPEED CONNECTION BETWEEN COMPUTERS AND PERIPHERAL DEVICES, filed Jun. 18, 1997, Ser. No. 08/878,081. The copending application and the present application are owned by a common assignee.

BACKGROUND OF THE INVENTION

The Small Computer Systems Interface [SCSI] bus is used extensively for computer peripheral devices. It is designed for use with hard drives, tape drives, scanners, CD Roms, printers and computers. Indeed, all computers from small personal computers to workstations to mainframes are equipped with SCSI interfaces.

It is often necessary to connect multiple numbers of computers to multiple numbers of SCSI peripheral devices. Connection of an SCSI device to a computer equipped with an SCSI interface is point to point through a standard SCSI cable a few meters in length. Hence the conventional means of accessing an SCSI device is accomplished through the computer to which the SCSI device is attached. Clustering of these SCSI devices requires a Local Area Network [LAN] switch that connects the computers where the SCSI devices are attached through Network Interface Cards [NICs] which are installed within the computers.

The use of LAN switches and these interface cards increases the cost and complexity of interconnecting multiple computers to multiple peripheral devices. Moreover, such use greatly reduces the speeds of interconnection. For example, the most widely used LAN interface, fast Ethernet, has a maximum speed of 200 megabits per second, whereas SCSI devices are capable of speeds up to 320 megabits per second. In the aforementioned copending application, a new type of high speed switch is introduced which not only permits the peripheral devices to be operated at their maximum speeds, but also eliminates the need for LAN switches and interface cards.

However, it is often necessary for host computers and peripheral devices to be interconnected under conditions when the devices are disposed remotely, perhaps on the order of kilometers of separation, from the host computers. Under these conditions, a Wide Area Network, [WAN] is employed in establishing such interconnections. The WAN routers employ network layers which increase cost and complexity of the system. Moreover, WAN connections employ interconnection speeds which are limited to a few megabits per second. This sharply degrades the SCSI speed capability of 320 megabits otherwise available for use in the system.

In the present invention, the WAN connections and routers are eliminated, and a switch fabric is substituted which utilizes remotely disposed switches optically interconnected through optical transceivers which are capable of moving data in gigabits per second speed. As a result, the cost and complexity of the system is much reduced while the transmission speed is greatly increased.

SUMMARY OF THE INVENTION

In accordance with the principles of this invention, a new type of switch assembly is utilized in connecting computers to SCSI peripheral devices in such manner that data can be piped directly from computers to SCSI peripheral devices using remotely disposed switches optically interconnected.

More particularly, the invention utilizes first and second crosspoint switches. Each switch is provided with a first terminal set and a second terminal set, each set containing a like number of terminals. Each switch has a first connection position at which the first set terminals are input terminals and the second set terminals are output terminals and has an alternative second connection position at which the first set of terminals are output terminals and the second set of terminals are input terminals.

The invention also utilizes first and second component assemblies, each first and second assembly being associated with a corresponding one of said switches. Each of these first and second component assemblies includes an internal system bus connected in bi-directional manner to a first switch control section, a data multiplexer and de-multiplexer, and a CPU with watch dog timer, and further includes a routing table connected to said CPU and an optical transceiver connected to said multiplexer and de-multiplexer.

Bi-directional means connects the first switch control section of the first assembly to a selected second set terminal of the first switch and connects the first switch control section of the second assembly to a selected second set terminal of the second switch.

An optical fiber transmission cable interconnects both optical transceivers.

The invention also utilizes third and fourth component assemblies. Each of the third and fourth assemblies is associated with a corresponding one of said switches. Each third and fourth assembly includes an internal system bus connected in bi-directional manner to second and third switch control sections, a buffer memory, a table memory, and a CPU with watch dog timer.

Bi-directional means connects the third switch control section of the third assembly to a selected first set terminal of the first switch and connects the third switch control section of the fourth assembly to a selected first set terminal of the second switch.

A host computer is connected in bi-directional manner to a host SCSI connector and an SCSI bi-directional cable interconnects the second switch control section of the third assembly and the host SCSI connector.

A SCSI peripheral device is connected in bi-directional manner to a device SCSI connector and a SCSI bi-directional cable interconnects the second switch control section of the fourth assembly and the device SCSI connector.

The invention then functions as follows. The host computer via its host connector and its SCSI cable issues a SCSI command to the second switch control section in the third assembly. This second section via the internal system bus supplies the command to the CPU, the two memories and the third switch control section. Under control of the CPU, the memory table packs the command with the proper address for the selected SCSI peripheral device, the buffer memory stores the packed command as required for buffering and the third switch section places the first switch in its first connection position and sends the command via a selected first set terminal and a selected second set terminal to the first switch control section of the first assembly. The packed command block is forwarded to the selected output terminal. At the same time, the CPU in the third assembly disconnects the connection port from the previously connected SCSI host cable.

The packed command block then arrives at the first switch control section of the first assembly and via the internal system bus in the first assembly. The block, under the control of the CPU in the first assembly is multiplexed, its next address is identified by the routing table, and is then transmitted by the optical transceiver in the first assembly and the optical filter cable and is received by the optical transceiver in the second component assembly.

In the second assembly, the block is de-multiplexed under the control of the CPU, the route is selected and the switch control section places the second switch in its second connection position and sends the command via a selected second set terminal and a selected first set terminal to the third switch control section of the fourth assembly.

The fourth assembly then via the second switch control section activates the selected device SCSI connector and sends the command to the selected SCSI peripheral device.

The host computer typically will send a host write to the device. The device will in turn send back an appropriate data signal with the various assemblies and switches being connected in reverse manner to supply the data signal to the host computer.

The watch dog timers are provided for use when a hung connection is detected.

As explained above, in this invention WAN connections and routers are eliminated, and a switch fabric is substituted utilizing remotely disposed switches having optical transceivers interconnected by a fiber optical cable. The transceivers and optical cable are capable of moving data in gigabits per second speed. As a result, the cost and complexity of the system is much reduced while the transmission speed is greatly increased.

BRIEF DESCRIPTION OF THE DRAWINGS

The accompanying drawing is a block diagram of a preferred embodiment of the invention.

DETAILED DESCRIPTION OF PREFERRED EMBODIMENTS

Referring now to the accompanying drawing, the invention utilizes first and second crosspoint switches 100 and 102. Each switch is provided with a first terminal set and a second terminal set, each set containing a like number of terminals. Each switch has a first connection position at which the first set terminals are input terminals and the second set terminals are output terminals and has an alternative second connection position at which the first set of terminals are output terminals and the second set of terminals are input terminals. In the drawing, the first set of terminals are disposed on the left side of each switch and the second set of terminals are disposed on the right side of each switch.

The invention also utilizes first and second component assemblies, 104 and 106, each first and second assembly being associated with a corresponding one of said switches. Each of these first and second component assemblies includes an internal system bus 108 connected in bi-directional manner to a first switch control section 110, a data multiplexer and de-multiplexer 112, and a CPU with watch dog timer 114, and further includes a routing table 16 connected to said CPU and an optical transceiver 118 connected to said multiplexer and de-multiplexer.

Bi-directional means 120 connects the first switch control section of the first assembly to a selected second set terminal of the first switch and bi-directional means 122 connects the first switch control section of the second assembly to a selected second set terminal of the second switch.

An optical fiber transmission cable 124 interconnects both optical transceivers.

The invention also utilizes third and fourth component assemblies 126 and 128. Each of the third and fourth assemblies is associated with a corresponding one of said switches. Each third and fourth assembly includes an internal system bus 130 connected in bi-directional manner to second and third switch control sections 132 and 134, a buffer memory 136, a table memory 138, and a CPU with watch dog timer 140.

Bi-directional means 142 connects the third switch control section of the third assembly to a selected first set terminal of the first switch and bidirectional means 144 connects the third switch control section of the fourth assembly to a selected first set terminal of the second switch.

A host computer 146 is connected in bi-directional manner to a host SCSI connector 148 and a SCSI bi-directional cable 150 interconnects the second switch control section of the third assembly and the host SCSI connector.

A SCSI peripheral device 152 is connected in bi-directional manner to a device SCSI connector 154 and a SCSI bi-directional cable 156 interconnects the second switch control section of the fourth assembly and the device SCSI connector.

The invention then functions in the manner previously described.

While the invention has been described with particular reference to the preferred embodiment and the drawing, the protection sought is to be limited only by the terms of the claims which follow.

What is claimed is:

1. Apparatus comprising:

first and second crosspoint switches, each switch being provided with a first terminal set and a second terminal set, each set containing a like number of terminals, each switch having a first connection position at which the first set terminals are input terminals and the second set terminals are output terminals and having an alternative second connection position at which the first set of terminals are output terminals and the second set of terminals are input terminals;

first and second component assemblies, each first and second assembly being associated with a corresponding one of said first and second switches, each assembly including an internal system bus connected in bi-directional manner to a first switch control section, a data multiplexer and de-multiplexer, and a CPU with watch dog timer, and further including a routing table connected to said CPU and an optical transceiver connected to said multiplexer and de-multiplexer;

bi-directional means connecting the first switch control sections of the first assembly to a selected second set terminal of the first switch and connecting the first switch control section of the second assembly to a selected second set terminal of the second switch; and an optical fiber transmission cable interconnecting both optical transceivers.

2. Apparatus as set forth in claim 1, further including third and fourth component assemblies, each of the third and fourth assemblies associated with a corresponding one of said first and second switches, each third and fourth assembly including an internal system bus connected in bi-directional manner to second and third switch control sections, a buffer memory, a table memory, and a CPU with watch dog timer; and bi-directional means connecting the third switch control section of the third assembly to a selected first set terminal of the first switch and connecting the third switch control section of the fourth assembly to a selected first set terminal of the second switch.

3. Apparatus as set forth in claim 2 further including a host computer connected in bi-directional manner to a host SCSI connector and a SCSI bi-directional cable interconnecting the second switch control section of the third assembly and the host SCSI connector.

4. Apparatus as set forth in claim 3 further including an SCSI peripheral device connected in bi-directional manner to a device SCSI connector and a SCSI bi-directional cable interconnecting the second switch control section of the fourth assembly and the device SCSI connector.

* * * * *